(No Model.) 2 Sheets—Sheet 1.
E. THOMSON.
ELECTRIC SOLDERING.
No. 496,019. Patented Apr. 25, 1893.
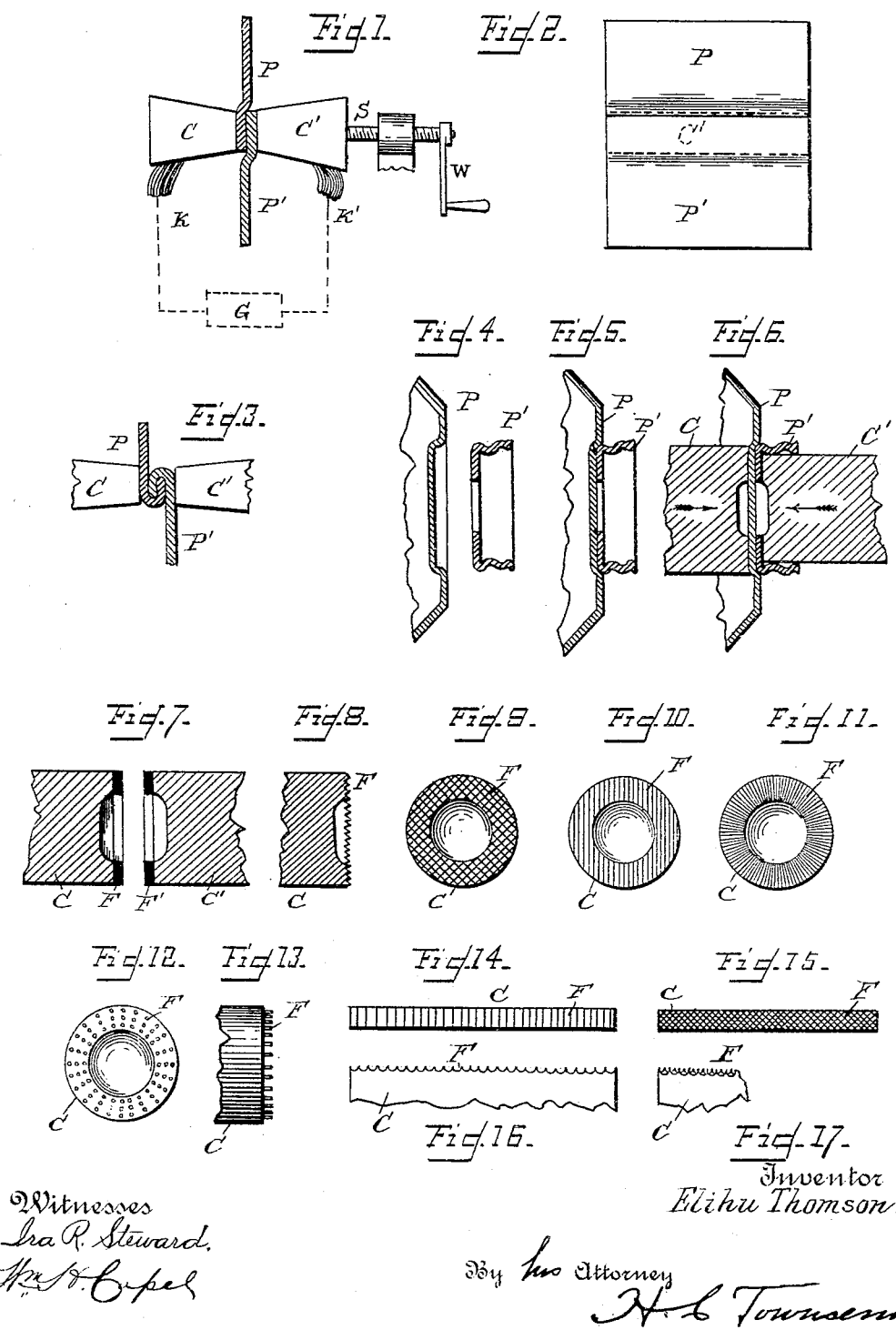
Witnesses
Ira R. Steward.
Wm H Capel
Inventor
Elihu Thomson:—
By his Attorney
H L Townsend (No Model.)  
2 Sheets—Sheet 2.
E. THOMSON.
ELECTRIC SOLDERING.
No. 496,019.  Patented Apr. 25, 1893.
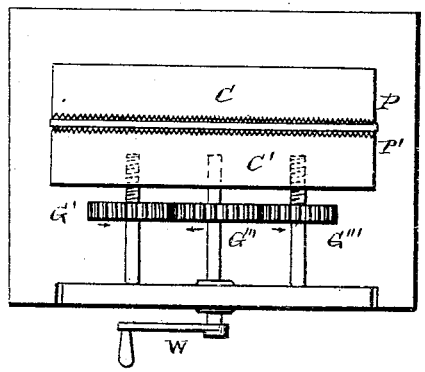
Fig. 18.
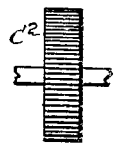
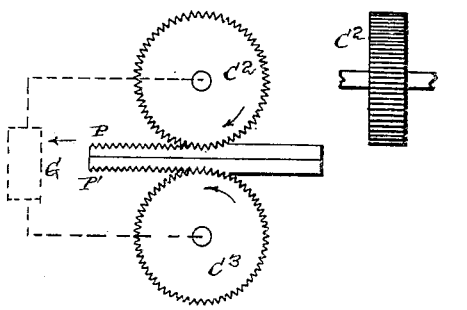
Fig. 19.  Fig. 20.
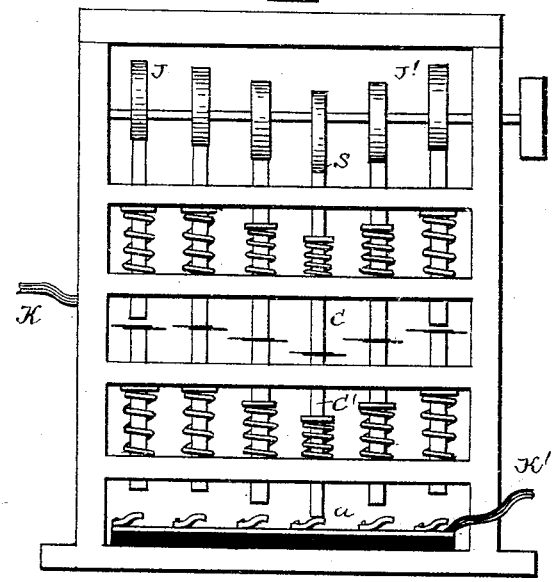
Fig. 21.
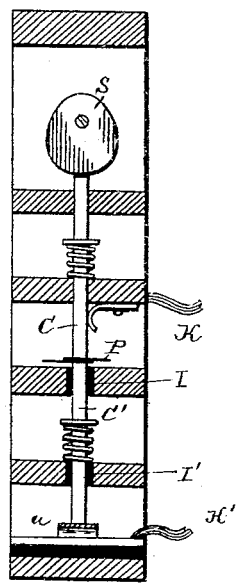
Fig. 22.
Witnesses  
Ira R. Steward  
Jno. H. Capel
Inventor  
Elihu Thomson  
By his Attorney  
H. C. Townsend

UNITED STATES PATENT OFFICE.

ELIHU THOMSON, OF LYNN, MASSACHUSETTS, ASSIGNOR TO THE THOMSON ELECTRIC WELDING COMPANY, OF MAINE.

ELECTRIC SOLDERING.

SPECIFICATION forming part of Letters Patent No. 496,019, dated April 25, 1893.

Application filed January 22, 1889. Serial No. 297,161. (No model.)

*To all whom it may concern:*

Be it known that I, ELIHU THOMSON, a citizen of the United States, and a resident of Lynn, in the county of Essex and State of Massachusetts, have invented a certain new and useful Electric Soldering, of which the following is a specification.

My present invention relates to an improved method of producing soldered joints between metal pieces, and is particularly applicable to soldering sheet metal pieces flatwise. When applied to tin plate the tin itself which covers the iron plate is often sufficient for the uniting solder. In other cases solder may be applied.

My invention consists in clamping or pressing the pieces together at the seam or joint, passing an electric current through either or both of the pieces to be joined, and in sufficient volume to melt the solder or uniting metal, cutting off the heating electric current, and maintaining the pressure until the joint is sufficiently cool.

Great difficulties have hitherto been experienced in soldering long seams owing to the fact that the cooling takes place unequally and, at the moment the solder sets, parts of the seam contract and draw so as to break the joint. The pressure which holds the pieces together must be continued and the piece held rigidly during the cooling or setting of the solder. This is easily accomplished in my invention since the cutting off of the current allows the pieces to cool, while the pieces still remain clamped and held firmly during the setting of the fused metal.

My present invention, like my prior inventions in electric soldering, brazing and welding, involves the use of electric currents of low potential but large volume derived from any suitable source, together with suitable devices whereby the current may be cut off or regulated.

My invention comprises further an improvement in electric soldering consisting essentially in establishing an electric resistance to the passage of the current from the clamp or pressure block back of the joint to the metal or the work to be joined. This may be done either by modifying the surface of the pressure block itself or by modifying the surface on which it bears, or both, or by the interposition of a thin septum, layer or zone of resisting material, or material modified in condition or form so as to oppose a resistance to the passage of an electric current. Some of these means for establishing a resistance are hereinafter more particularly described.

In the accompanying drawings:—Figure 1, shows apparatus that may be used in practicing my invention. Fig. 2, is a view of the work. Figs. 3, 4, 5 and 6, show other forms of joint and of work. Figs. 7, 8, 9, 10, 11, 12 and 13, are sectional, side and face views of clamps having particular kinds of contact faces. Figs. 14, 15, 16 and 17, are face and side views of elongated clamps for use in connection with long joints. Fig. 18, is a plan of mechanism for operating an elongated clamp. Fig. 19, is an end elevation of pressure rollers applied to the work of soldering in accordance with my invention. Fig. 20, is an edge view of a roller. Fig. 21, is an elevation of a gang of clamps and mechanism for operating the same successively and establishing electrical connection with them in accordance with my invention. Fig. 22, is a side elevation of a pair of clamps the frame in which they are mounted being shown in cross section.

In Fig. 1, P, P', are sheet metal pieces such as tin plate which are overlapped for a joint and pressed together at the overlapped portion by pressure pieces C, C', one or both of which are movable, as C', under the influence of a screw S, which, turned by a suitable crank or other device, gives pressure to hold the pieces P, P', firmly and squarely. The pieces C, C', may be suitably guided so as to move in a right line toward and from the other, the surfaces bearing on the overlap of the plates P, P', being made true and square so as to bear evenly thereon. Heavy electric currents are conveyed to the clamp pieces C, C', by conductors K, K', or in any suitable way from a source indicated by G. In the case of the pieces P, P', of tin plate, a union takes place at the overlap when a sufficient strength of current to melt the tin between the surfaces has been passed. The current being then cut off the pieces are allowed to cool in position under pressure until thoroughly joined after which the pressure is taken off and the pieces removed. In other cases solder is applied to the joint when hot. The union is facilitated by a flux, if needed. Slightly oiling the melting surfaces with lard oil or other stearine containing oil will easily suffice when the pieces P, P', are tin plate.

Fig. 2, shows the pieces P, P', flatwise, and in dotted lines, the position of the contact clamp piece C'. The clamping devices and the means for regulating or controlling the current may be such as are described in my prior patents Nos. 347,140, 347,141 and 347,142, or the clamping or pressure devices may be suitably modified, as to the shape of their clamping devices, when found desirable. It is not necessary in every case to pass the current across the joint from one piece to the other. The current might be passed in the general direction of the line or plane of the joint.

Fig. 3, shows that the joint to be made may be a double lap instead of the single lap as in Figs. 1 and 2. The same application of considerable pressure, passage of soldering current and cooling under pressure with the current taken off, may be carried out with such a joint.

Figs. 4, 5 and 6, illustrate the union of two tin plate pieces of a different form. P, is a round plate struck up into form. P', is a ring piece with one edge turned in as indicated. The two are put together, as in Fig. 5, the pressure blocks C, C', applied to force the meeting surfaces into close and firm contact, and current is put on until the tin on the meeting surfaces melts and unites them as in Fig. 5. The blocks C, C', may be of iron or other metal, as may those of Figs. 1, 2 and 3, but to concentrate the heat in the pieces P, P', I prefer to make them of steel or iron, or copper, and face them with a facing such as hard carbon, or form their surfaces which are to be applied to the work as will be described farther on.

The facing of hard carbon F, F', Fig. 7, of the blocks C, C', Fig. 6, is for the purpose of producing an electrical resistance at the work, or where the current enters the work, which tends to the accumulation of heat thereat with less current strength. The joint between the carbon pieces F, F', and the blocks C, C', should be good and made by electroplating the carbon and securing the pieces together by brazing for example. But on account of the difficulty of this, and of the fact that the carbon is fragile, I prefer another arrangement as indicated in Figs. 8, 9, 10, 11, 12 and 13. This is simply the forming of the faces of the contact and pressure blocks C, C', with notches or grooves which leave only a series of points or ridges projecting, but in a surface which will fit the work. Thus as shown in Fig. 9, a double deep set of grooves may be made crossing at an angle as indicated leaving the surface uniformly covered with raised points, or projections. In Fig. 10, a parallel set of grooves is shown cut in the surface producing a closely placed set of ridges of narrow width. In Fig. 11, the ridges are radial and formed as a consequence of the grooving being radial. In the form shown in Figs. 12 and 13, (which are respectively a face view and a side view of such a block as C, Fig. 6,) a multitude of fine wires are left to project slightly from the surface of C, at F, and are ground down to a level of numerous projecting points in one plane. In all these cases the conduction of heat away from the pieces held between the blocks is greatly checked by the form given to the surfaces as described, and the resistance to the passage of current at the work is increased which in itself results in further production of heat at the sheet metal pieces where pressed up together between the conducting blocks C, C'.

Figs. 14 and 15, show the grooving of the pieces at F, which are long and narrow and are used for long seams in place of those shown in Figs. 1 and 2. Fig. 16, shows the same with the two crossed sets of grooves leaving a set of points projecting from the surface.

Fig. 17, shows the block C, of Fig. 15, in edge view.

Fig. 18, shows one of the many means that may be used for securing sufficient pressure of the blocks C, C', upon—the pieces P, P', which are to be united together by current circulating in large amount from one block to the other through the work. A handle W, turns a right hand screw which is geared at G', G'', G''', to two left hand screws all turning together to move the block C', toward or from stationary block C, as the need may be. The circuit connections are omitted for simplicity.

In Fig. 19, the pieces P, P', are shown as being rolled together between rollers $C^2$, $C^3$, connected with the source of current and whose outer surfaces are corrugated or grooved as with the pressure pieces before described. The rollers exert pressure while the current heats the thin metal pieces at successive points between the rollers. One of the rollers is shown in edge view in Fig. 20.

Fig. 21, shows how in one machine several sets of pressure pieces and current applying blocks may be successively operated, as where many pieces are to be operated upon in a given time. J to J', is a series of cams on a shaft driven by a pulley D, belted to power. The cams are set to act successively on the plungers C, so as to depress them successively against the action of the springs which raise them. Corresponding lower plungers C', insulated from the upper ones C, are arranged to be depressed in pinching or clamping the pieces between them. This is shown in Fig. 22, which is a view of one set only of the cams and plungers. I, indicates insulation about plunger C'. After pressure has been exerted to clamp the pieces the continued depression of the plungers by the cam S, brings the lower end of C', at $a$, in contact with a current feeding plate below connected with a conductor K', from the current source, the other conductor K, running to the upper plungers as C. The sequence of actions then, is as follows:—Pieces are placed between the plungers, pressure is applied by cams S, current passes through the pieces, when the plungers are fully depressed, current is cut off as plungers begin to rise, and finally the pieces are released as the cam completes its revolution. These actions occur respectively at different times with the different sets of plungers.

My present invention is especially applicable to use in uniting thin metals such as tin plates, without solder other than the tin on the surfaces, or with solder when found desirable.

What I claim as my invention is—

1. The herein described method of producing soldered metal joints, consisting in clamping the pieces together at the seam or joint, passing an electric current through either or both the pieces to be joined and in sufficient volume to melt the solder or uniting material, cutting off the heating current, maintaining the clamping pressure until the joint cools, and then removing the pressure.

2. The herein described improvement in uniting thin metal plates by a heating electric current passed through the metal and cementing material between the pieces to be united consisting in clamping the pieces between two electrodes, passing electric current from one to the other, and maintaining the clamping pressure upon the pieces after the heating current is withdrawn and until the joint is cooled.

3. The herein described improvement in electric soldering, cementing or similar operations which consists in passing the heating electric current into the metal of the pieces to be soldered or joined, through an artificial electric resistance established at the point of connection of the work with the exterior electric circuit.

Signed at Lynn, in the county of Essex and State of Massachusetts, this 18th day of January, A. D. 1889.

ELIHU THOMSON.

Witnesses:
O. K. STUART,
J. W. GIBBONEY.